United States Patent [19]

Kikuchi et al.

[11] 3,857,967

[45] Dec. 31, 1974

[54] PREPARATION OF FOOD AND BEVERAGES WITH PEPTIDOGLUTAMINASE

[75] Inventors: Mamoru Kikuchi, Nagareyama; Kenji Sakaguchi, Kashiwa; Eiichi Nakano, Noda, all of Japan

[73] Assignees: Kikkoman Shoyu Co., Ltd.; Noda Institute for Scientific Research, both of Noda-shi, Japan

[22] Filed: Aug. 10, 1973

[21] Appl. No.: 387,375

Related U.S. Application Data

[60] Division of Ser. No. 141,704, May 10, 1971, Pat. No. 3,796,633, which is a continuation-in-part of Ser. No. 71,129, Sept. 10, 1970, abandoned.

[52] U.S. Cl.................... 426/18, 426/36, 426/42, 426/46
[51] Int. Cl............................................. A23l 1/20
[58] Field of Search.............. 426/46, 42, 18, 36, 38

[56] References Cited
UNITED STATES PATENTS

| 3,674,508 | 7/1972 | Kasik et al. | 426/46 X |
| 3,694,221 | 9/1972 | Hoer et al. | 426/46 |

*Primary Examiner*—Lionel M. Shapiro
*Attorney, Agent, or Firm*—Cushman, Darby & Cushman

[57] ABSTRACT

A novel enzyme, peptidoglutaminase, which is obtained from a newly isolated strain of microorganism belonging to *Bacillus circulans*, has an activity to react with glutaminyl-peptides where glutamine is located at C-, N-terminals and the internal positions of peptides without splitting these peptide bonds, has an ability to deamidate γ-amide group of such glutamine to glutamyl-peptides. The enzyme, when added to a protein containing raw material for production of beverages and foods, may markedly enhance the resulting beverages and foods in palatability.

3 Claims, 3 Drawing Figures

PREPARATION OF FOOD AND BEVERAGES WITH PEPTIDOGLUTAMINASE

This application is a division of application Ser. No. 141,704 filed May 10, 1971 and now U.S. Pat. No. 3,796,633, which parent application is a continuation-in-part of application Ser. No. 71,129 filed Sept. 10, 1970 and now abandoned.

This invention relates to a process for preparing a new peptidoglutaminase having an activity capable of effecting deamidation of glutamine in peptides and to a process for producing beverages and foods in which the present enzyme is used and thereby to enhance said beverages and foods in palatability.

Glutaminase is an enzyme which is able to hydrolyze glutamine to glutamic acid and ammonia. It is well known that the glutaminase is obtained from animals, plants and microorganisms.

This enzyme, however, specifically reacts with only free glutamine and is unable to deamidate γ-amide group of glutamine where the glutamine is bonded to peptides. In the production of glutamic acid using glutaminase, therefore, it has heretofore been adopted such a method in which protein is first decomposed with using such enzymes as protease or peptidase to liberate glutamine and then the liberated glutamine is allowed to react with glutaminase to deamidate γ-amide group of said liberated glutamine, thereby to yield the desired glutamic acid.

However, when protein is first hydrolyzed, according to such a method mentioned above, by aid of the action of protease, peptidase or the like, a free glutamine or a glutamine being bonded to N-terminal of peptide is produced. Such glutamines are liable to form tasteless pyroglutamic acid because γ and α-positions of glutamine tend to bond cyclically to each other. Particularly, in the case of the latter glutamine being bonded to N-terminal of peptide, it is not subject to deamidation even when glutaminase is present therewith, and form pyroglutamyl peptides in a state of being bonded to peptide, and hence cannot be converted to glutamic acid.

Accordingly, in the production of beverages and foods such as soy sauce, miso (bean paste), cheese and the like using protein-containing substances as a raw material, it has heretofore been known to permit proteolytic enzymes, i.e. protease, peptidase or the like, to react with the raw material, thereby to obtain peptides or amino acids. As mentioned previously, when protein is decomposed with the proteolytic enzymes in order to further increase the resulting glutamic acid and the glutamyl-peptides in their amounts, glutamine is liberated as a free glutamine or becomes glutaminyl-peptides where glutamine is on the N-terminal of the peptide. Such glutamines convert very easily to pyroglutamic acid in an acidic or neutral solution, where γ- and α-positions of quickly bond to each other in a cyclical form. That is, peptide type glutamine is not subject to deamidation even in the presence of a common glutaminase and especially, amino-terminal peptide-bonded glutamine becomes peptide-bonded pyroglutamic acid while remaining in a peptide type glutamine state and becomes tasteless, because the common glutaminase reacts only with a free glutamine.

Furthermore, when glutamine is liberated once, the velocity to form pyroglutamic acid thereof is very fast, and hence it is preferable to effect, if possible, deamidation of glutaminyl-peptides, as it is, thereby converting the same to glutamyl-peptides.

Heretofore, as an enzyme capable of reacting with peptide-bonded glutamine, trans-glutaminase was disclosed by H. Waelsch et al., Archiv. Biochem. Biophys, 84, 528 (1959) and by J. E. Folk and P. W. Cole, J. Biol. Chem., 240, 2951 (1965). This enzyme is known to show a weak deamidation activity upon γ-amide group of glutaminyl-peptides. Originally, however, this enzyme is not such hydrolytic enzyme as glutaminase, but it is characterized by a substitution reaction of γ-amide group of glutamine in protein or peptide with a primary amine, and is very weak in the aforesaid activity of hydrolysis. Furthermore, it does not react at all with certain peptides such as glycyl glutamine, glutaminyl glycine, glycylglutaminyl glycine and the like.

Accordingly, the trans-glutaminase are inconvenient in the production of glutamic acid using protein as a raw material or in the preparation of beverages and foods where the content of glutamic acid is important for their palatability. Further, the source of supply of this trans-glutaminase is limited, because it is obtained from the liver of guinea pig.

An object of the present invention is to provide an enzyme which is capable of deamidating γ-amide group of glutamine in peptides irrespectively of the adjacent amino acids, as a method to obtain a large amount of glutamic acid from protein-containing raw materials without forming pyroglutamic acid.

Another object of the present invention is to provide a process for obtaining an enzyme capable of increasing the amount of L-glutamic acid or glutamyl-peptides contained in beverages and foods which are prepared by hydrolysis of protein-containing raw materials and which contains the resultant peptides of amino acids as a part of palatable components thereof.

A further object of the present invention is to provide a process for producing beverages and foods in which the content of L-glutamic acid or glutamyl-peptides may be increased by allowing said beverages and foods to react with an enzyme having the aforesaid activity. Further objects and purposes of the present invention will appear from the following description and Examples.

The present inventors extensively studied and investigated for achieving the aforesaid objects. As a result, they have found that a new strain No. 466 which has been isolated newly by the present inventors from soil and is considered to belong to the genus *Bacillus circulans*, is able to produce an enzyme which reacts directly with glutamine being bonded to peptide as such and deamidates γ-amide group of glutamine without splitting the peptide bond, and have accomplished the present invention based on the above finding. Since such enzyme as found by the present inventors has never been known heretofore, they have named this enzyme peptidoglutaminase (hereinafter referred to as "PGase").

Further studies conducted by the present inventors on this enzyme have resulted in the finding that this enzyme of one type reacts with the glutamine located at the carboxyl terminal (C-terminal) of peptide, but does not substantially react with the glutamine located at the amino terminal (N-terminal) or at the internal position of the peptides, and this enzyme of the other type does not substantially react with the glutamine located at the carboxyl terminal (C-terminal) of peptide, but reacts with only glutamine located at the amino terminal (N-terminal) of peptide or at the internal position of the peptides. The present inventors have named the former enzyme peptidoglutaminase-I (PGase-I) and the latter enzyme peptidoglutaminase-II (PGase-II).

The present invention has been completed on the basis of the above finding, and is directed to a process for obtaining PGase, which is characterized by culturing in a culture medium a strain belonging to the genus *Bacillus*, in particular, and having a PGase-producing ability to accumulate the PGase in the cells of said strain and recovering said PGase from the cultured product, and also to a process for producing beverages and foods in which the present enzyme, PGase, is utilized.

Bacteriological properties of No. 466 strain which produce PGase are tabulated hereinbelow.

| | |
|---|---|
| (1) Cultural Characteristics: | |
| Meat broth: | Slight growth |
| Meat broth-agar: | Growth, 30°C. in 7 days |
| Lactose-meat broth-agar: | Good growth, circular, sticky, entire colony opaque, no coloring matter formed in a medium. |
| Gelatine stab: | No growth |
| Peptone-water: | Slight growth |
| Litmus milk: | No growth |
| (2) Morphological Characteristics: | |
| Size and form: | 0.4 – 0.6 × 2.2 – 4 μ, rod. |
| Flagellum: | Circumferential, motile |
| Spore formation: | Spore formed |
| (3) Physiological Characteristics: | |
| Gram stain: | Negative |
| Methyl red test: | Negative |
| Indole production: | Negative |
| Hydrogen sulfide: | Slightly produced |
| Ammonia production: | Slightly produced |
| Nitrate reduction: | Negative |
| Catalase production: | Positive |
| Gelatine liquefaction: | Negative |
| Starch hydrolysis: | Positive |
| Clotting milk: | Negative |
| Litmus milk reduction: | Negative |
| Utilization of ammonium salt: | Can grow using ammonium sulfate and ammonium chloride as nitrogen sources. |
| (4) Utilization of saccharide: | |
| Glucose +++ | Mannitol + |
| Fructose ++ | Glycerine + |
| Galactose +++ | Dextrine ++ |
| Mannose +++ | Starch +++ |
| Xylose +++ | Inulin + |
| Arabinose +++ | Glycogen +++ |
| Saccharose ++ | Rhamnose – |
| Lactose +++ | Salicin ++ |
| Treharose +++ | Alpha-methyl glucoside +++ |
| Raffinose +++ | |
| | Sorbitol + |
| Maltose +++ | |

– : Not utilized
+ : Slightly utilized
++ : Considerably utilized
+++ : Markedly utilized The bacteriological properties of said No. 466 strain were studied on the basis of the methods described in the Manual of Microbiological Methods (Society of American Bacteriologists, 1957) and then classified according to "Bergey's Manual of Determinative Bacteriology," 7th Edition (1957). As a result, it is recognized that No. 466 strain is negative in gram stain, forms spores and does not grow at 65°C., and hence this strain is considered to belong to *Bacillus circulans*. However, in view of the fact that said strain is quite aerobic and requires a carbon source for its growth and also it produces peptidoglutaminase, the strain may be considered as a new strain belonging to the genus *Bacillus*.

A culture of the present strain is on deposit under accession No. ATCC 21590 with American Type Culture Collection, Rockville, Md.

Usable as the strain in the present invention for production of the PGase are those which are capable of producing peptidoglutaminase and are belonging to the genus *Bacillus*, without limiting to No. 466 strain or its variants.

These strains capable of producing the present enzyme are cultured mainly in a liquid medium. The culture medium may contain various nutrition sources conventionally employed in the culturing of microorganisms. Particularly, however, in the case of culturing No. 466 strain of *Bacillus circulans*, lactose, starch, sucrose and the like are effectively used as a carbon source, but glucose is not preferable. As a nitrogen source, there may be used any of inorganic and organic nitrogen-containing substances, for example, ammonium salts such as ammonium sulfate, ammonium chloride and the like, peptone, Casamino acids, yeast extracts, soy bean powder and the like. In addition thereto, there may suitably be used such inorganic salts as phosphate, magnesium salts and the like, and slight amounts of other nutrient substances.

The culturing temperature employed in the present invention is 25°–35°C., preferably about 30°C. The optimum pH value is about 7.0. The culturing is carried out according to any of conventional culturing methods as long as it is effective under aerobic conditions. Particularly preferred one is an aeration culture, and it is commerically preferable to employ a jar fermenter equipped with an aeration-agitation apparatus to effect the culturing. The culturing is usually terminated after a 8–20 hour lapse, but it is continued, if necessary for additional about 8 hours to permit the cells of strain to effect self-digestion, thereby to excrete the accumulated enzyme from the cells.

After completion of the culturing, the desired petitidoglutaminase may be recovered, according to common methods for recovering enzyme, from the cultured product. However, the present enzyme is an intracellular enzyme. Therefore, the present enzyme is recovered from the cells of strain in the following manner. The enzyme is extracted by suspending the collected cells in a buffer such as a phosphate buffer solution, for example, and grinding the cells by means of a grinding machine, a sonic or supersonic crusher, a high pressure homogenizer, a French press or the like, or lyzing the cells using such bacteriolytic enzyme as lysozyme. Alternatively, the cells are shaken or allowed to stand in the presence of a solvent such as toluene or the like for an appropriate period of time and are permitted to effect self-digestion to excrete the accumulated enzyme from the cells, and the resultant solution was treated by means of filtration, centrifugal separation or the like to remove solid matters and thereby to obtained a crude enzyme liquid.

Furthermore, in the case where the whole cultured product is utilized as an enzyme material product without separating the cells as above, it is preferable to continue the culturing for additional about 8 hours by aeration-agitation or stationary culture method to permit the cells to effect self-digestion to eliminate the accumulated enzyme from the cells as much as possible.

The crude enzyme liquid thus obtained may be used as such or in the form of a crude enzyme powder after being subjected to lyophilization or aceton-treatment.

The crude enzyme liquid or crude enzyme powder of PGase obtained according to the above manner is charged, if necessary, with streptomycin to precipitate and remove nucleic acid, and then is fractionated by addition of ammonium sulfate, alcohol, acetone or the like to collect the fractionated precipitates. The precipitates is dialyzed with water and lyophilized in vacuo to obtain an standard product of ammonium sulfate-fractionated crude enzyme.

The standard product of the crude enzyme thus obtained may be treated further according to various purification processes known heretofore to give a highly purified standard enzyme preparation. Such purification processes includes, for example, a gel filtration process in which Sephadex G-200 (Pharmacia Co. Sweden), Bio Gel P-150 (Bio Rad Co. U.S.A.) and the like; an absorption and elution process in which such ion exchange substance as DEAE-Sephadex (Diethyl-aminoethyl Sephadex; Pharmacia Co. Sweden), TEAE-cellulose (Triethylaminoethyl cellulose; Brown Co. U.S.A.) and the like, and hydroxylapatite (Bio Rad Co. U.S.A.), and an electrophoresis process in which polyacrylamide and the like are used.

Purification of PGase obtained by culturing No. 466 strain of Bacillus circulans is illustrated below with reference to one example thereof.

The crude enzyme liquid containing PGase-I and PGase-II obtained from No. 466 strain is fractionated with ammonium sulfate, alcohol, acetone or the like to give an ammonium sulfate-fractionated enzyme mixture of PGase-I and PGase-II. This enzyme mixture is dissolved in a buffer solution prepared by mixing 1/100 M phosphate buffer solution (pH 7.6), 1/10 M potassium chloride and 2/1000 M EDTA (ethylene diamine tetracetate) together to obtain an enzyme liquid. This enzyme liquid is passed through a column packed with Sephadex G-200, to which the same buffer solution as above had been applied in advance, and then the same buffer solution was applied thereto to filter gels. Fractions of fraction No. 50-70 (fractionated into 10 ml. each) are collected to obtain a mixed partially purified enzyme of PGase-I and PGase-II.

Subsequently, the mixed partially purified enzyme is subjected to column chromatography wherein DEAE Sephadex is used.

Said partially purified enzyme is passed through a column which has been buffered in advance with a buffer solution prepared by mixing together 1/100 M phosphate buffer solution (pH 8.0), 1/10 M potassium chloride and 2/1000 M EDTA, thereby to adsorb PGase-I and PGase-II thereon, and the adsorbed PGase-I and PGase-II are eluted according to potassium concentration gradient of a buffer solution having the same composition and the same concentrations as mentioned above.

In the above-mentioned process step, PGase-I is eluted at the potassium chloride concentration of 0.17 M–0.21 M, and PGase-II at 0.22 M–0.27 M.

Effective fractions of the respective effluents thus obtained are collected, whereby partially purified enzyme solutions of PGase-I and PGase-Ii are obtained, respectively.

Subsequently, these enzyme solutions are subjected respectively to chromatography by means of a column packed with hydroxylapatite (Bio Gel HT).

The partially purified enzyme solution of PGase-I is adjusted to pH 7.0 with 1/100 M potassium hydrogen phosphate and then passed through hydroxylapatite column, which has been buffered in advance with 1/100 M phosphate solution, whereby PGase-I is adsorbed thereon. The adsorbed PGase-I is eluted according to linear concentration gradient of the same buffer solution as that applied to the column. Effective fractions of the PGase-I effluent are collected, whereby a purified enzyme preparation of PGase-I is obtained.

The partially purified enzyme solution of PGase-II is treated in the same procedure as above to obtain a purified enzyme preparation of PGase-II.

The process steps of extraction, separation and purification treatments of peptidoglutaminases-I and -II as illustrated above may be summarized together with the pertinent results thereof and tabulated in the following tables, respectively.

| PGase-I | Amount of enzyme contained (unit) | Specific * activity (unit/mg protein) | Yield |
| --- | --- | --- | --- |
| 1. Crude enzyme solution | 935 | 0.14 | 100 % |
| 2. Ammonium sulfate-fraction (precipitates formed at 0.38 – 0.54 saturation) | 954 | 1.00 | 102 % |
| 3. Filtration of gels with Sephadex G-200 column (highly purified fraction) | 540 | 27 | 57 % |
| 4. DEAE Sephadex column chromatography (highly purified fraction) | 309 | 16.3 | 33 % |
| 5. Hydroxyl apatite column chromatography (highly purified fraction) | 129 | 64.5 | 13 % |

* In the determination of activity, carbobenzoxy glutamine was used as a substrate.

| PGase-II | Amount of enzyme contained (unit) | Specific** activity (unit/mg protein) | Yield |
| --- | --- | --- | --- |
| 1. Crude enzyme solution | 1203 | 0.18 | 100 % |
| 2. Ammonium sulfate-fraction (precipitates formed at 0.38 – 0.54 saturation) | 858 | 0.9 | 96 % |
| 3. Filtration of gels with Sephadex G-200 column (highly purified fraction) | 784 | 39 | 65 % |
| 4. DEAE Sephadex column chromatography (highly purified fraction) | 638 | 33.6 | 53 % |
| 5. Hydroxyl apatite column chromatography (highly purified fraction) | 256 | 73.2 | 21 % |

** In the determination of activity, carbobenzoxy glutaminyl proline was used as a substrate.

The assay method of the PGases are as follows: respective substrates were dissolved in the concentration of 10 mM in a 40 mM phosphate buffer pH 7.5, added with suitably diluted PGase solution or suspension of *Bacillus circulans* cells to a final volume of 1.0 ml, incubated for 10 minutes at 30°C. The reaction was terminated by adding 0.1 ml of 50 % trichloroacetic acid, and the liberated ammonia was assayed as usual.

That is, 0.5 ml. of the reaction mixture is adjusted to pH 6.5 with 1N NaOH and then charged into a small glass vessel. Following the procedure of Cedrangoro et al. (Enzymologia, 29, 143, 1965), 1 ml. of a borate buffer solution (pH 10.8) is added to the contents of the glass vessel, the discharged ammonia is absorbed by 5N sulfuric acid, and the mixture is allowed to form color by use of Nessler's reagent, and light absorptivity of the formed color is measured at 420 m$\mu$. The amount of enzyme contained was expressed by a unit taken as an amount of the enzyme capable of producing 1$\mu$ mol/min. of ammonia under the above-mentioned reaction conditions. The specific activity was expressed by number of enzyme units per mg. of protein. In this case, the amount of protein was determined according to Biuret method or ultraviolet absorption methods (Method in Enzylogy, III, 450 to 451, 1957).

The above-mentioned respective enzyme fractions at the final purification stage were dialyzed with an appropriate buffer solution, and then lyophilized and dried to obtain purified PGase-I and PGase-II in the form of a white powder. Furthermore, these PGase-I and PGase-II were subjected to Sephadex G-100 column chromatography to found that both of them had a single peak, respectively.

The properties of PGase-I and PGase-II as novel enzymes obtained according to the present process are explained hereinbelow.

1. Activity

The present enzymes have an activity to deamidate glutaminyl-peptides to glutamyl-peptides. Among these enzymes, PGase-I is capable of effecting deamidation of glutamine which is located at the carboxy terminal of the peptides without splitting peptide linkage. While PGase-Ii reacts with only the $\gamma$-amide group of the glutamine being bonded to N-terminal of the peptide or at the internal position of the peptides.

These activities of the present enzymes will be illustrated below with reference to test examples. In case of PGase-I, carbobenzoxy L-glutamine (hereinafter referred to as "CBZ-L-Gln") was used as a substrate, where was carbobenzoxy L-glutaminyl glycine (hereinafter referred to as "CBZ-L-Gln-Gly") in case of PGase-II. Their respective activities were confirmed, as shown in the following table, by subjecting their respective substrates, with which these enzymes had been allowed to react, to thin layer cheomatography and filter paper-electrophoresis.

| Compound | Thin layer chromatography Solvent system (Rf value) | | | | Electrophoresis Distance from original point to a point of phoresis (cm) |
|---|---|---|---|---|---|
| | A | B | C | D | |
| Product obtained by reacting PGase-I with CBZ—L—Gln | 0.96 | 0.91 | 0.44 | 0.19 | 12.8 |
| CBZ—L—Gln | 0.83 | 0.81 | 0.26 | 0.08 | 9.2 |
| CBZ—L—Glu | 0.96 | 0.91 | 0.44 | 0.19 | 12.8 |
| Product obtained by reacting PGase-II with CBZ—L—Gln—Gly | 0.80 | 0.85 | 0.13 | 0.03 | 12.6 |
| CBZ—L—Gln—Gly | 0.66 | 0.72 | 0.04 | 0.01 | 8.8 |
| CBZ—L—Glu—Gly | 0.80 | 0.85 | 0.13 | 0.03 | 12.7 |

1 Solvent system:
  A: n-Butanol:acetic acid:water = 4:1:1
  B: n-Butanol:acetic acid:5 % ammonia water = 5.5:3:1.5
  C: Ethyl acetate:benzene:acetic acid = 50:50:2
  D: Chloroform:methanol:acetic acid = 95:5:3
2 Electrophoresis:
  Buffer solution; pyridine:acetic acid:water = 25:1:225
  2000 V, 70 min.
3 CBZ—L—Glu: Carbobenzoxy L—glutamic acid
  CBZ—L—Glu—Gly: Carbobenzoxy L—glutamyl glycine The above results show that CBZ-L-Glu and CBZ-L-Glu-Gly were produced. Since no free glutamine, free glutamic acid and free glycine were not detected, this indicates that both PGase-I and PGase-II are capable of deamidating glutaminyl-peptides to glutamyl-peptides.

2. Substrate specificity

In the following table, the numerical value represents micromol of ammonia liberated by mg. of enzyme in a minute.

| Substrate | PGase-I NH₃ micromol/min. | PGase-II NH₃ micromol/min. |
|---|---|---|
| Carbobenzoxy-L-glutamine | 62.2 | 1.7 |
| Glycyl-L-glutamine | 61.2 | 0.4 |
| L-Tyrosyl-L-glutamine | 61.0 | 0.6 |
| N-Acetyl-L-glutamine | 53.8 | 0.7 |
| Phthaloyl-DL-glutamine | 27.0 | 0.4 |
| L-Prolyl-L-glutamine | 44.1 | 0.1 |
| L-Leucyl-glycyl-L-glutamine | 48.5 | 0.1 |
| Carbobenzoxy-L-glutaminyl-L-proline | 0 | 73.0 |
| Carbobenzoxyl-L-glutaminyl-L-glycine | 0 | 52.4 |
| t-Amyloxycarbonyl-L-glutaminyl-L-proline | 0 | 39.2 |
| L-Phenylalanyl-L-glutaminyl-glycine | 0 | 33.5 |
| Pyroglutaminyl-L-glutaminyl-L-alanine | 0 | 26.2 |
| L-glutaminyl-glycine | 0.98 | 27.8 |
| L-Glutamine | 4.8 | 1.5 |
| L-Asparagine | 0 | 0 |
| Carbobenzoxy-L-asparagine | 0 | 0 |
| Glycyl-L-asparagine | 0 | 0 |
| L-Leucine-amide | 0 | 0 |
| Glycyl-L-phenylalanine-amide | 0 | 0 |

| | | PGase-I | PGase-II |
|---|---|---|---|
| (3) | Optimum pH range | 7.0 – 8.0 | 6.5 – 8.0 |
| (4) | Stable pH range | 6.0 – 11.4 (4°C. for 16 hrs.) | 6.0 – 11.4 (4°C. for 16 hrs.) |
| (5) | Optimum reaction temperature range | 10° – 45°C. | 10° – 40°C. |
| (6) | Conditions of inactivation | Completely inactivated at pH 2.5, 4°C. for 16 hours | do. |
| | | Inactivated by 30 % at pH 5.0, 4°C. for 16 hours | Inactivated by 5 % at pH 5.0, 4°C. for 16 hours |
| | | Completely inactivated at pH 10.8, 37°C. for 2 hours | Completely inactivated at pH 10.0 37°C. for 2 hours |
| | | Completely inactivated at pH 7.6, 55°C. for 10 minutes | Completely inactivated at pH 7.6, 50°C. for 10 minutes |
| | | Inactivated by 50 % at pH 7.6, 50°C. for 10 minutes | Inactivated by 40 % at pH 7.6, 45°C. for 10 minutes |
| (7) | Inhibition | Inactivated by 30 – 60 % in the presence of Hg or Cu. | do. |
| | | With 20 % of NaCl at pH 7.5 showed 50 % of activity | do. |
| (8) | Activation | Slightly activated by glutathione | do. do. |
| (9) | Stability | Not substantially inactivated when lyophilized and preserved at −20°C. | do. |
| (10) | Molecular weight Molecular weight was determined according to Andrews method (P. Andrews, Biochem. J. 91, 222, 1964), using Sephadex G-100 | 80,000 – 90,000 | 130,000 – 140,000 |

Thus, the present peptidoglutaminases, PGase-I and PGase-II produced from strain No. 466 of *Bacillus circulans* have the properties as mentioned above. However, the peptidoglutaminase referred to in the present invention are not limited only to the aforesaid PGase-I or PGase-II. It is needless to say that all the enzymes are included in the scope of the present invention as long as they have an functional activity to deamidate glutaminyl-peptides to glutamyl-peptides.

Heretofore, there have been known many enzymes capable of hydrolyzing γ-amide group of glutamine, said enzymes being obtained from various animals and plants. For example, these enzymes include glutaminase [The Enzymes, volume 4, 285 (1960)], trans-glutaminase [J. Biol. Chem. 240, 2951 (1965)]. The present enzymes are entirely different, as shown above, from such enzymes as identified above in substrate specificity. That is, glutaminase is not capable of deamidating γ-amide group of glutamine being bonded to peptides. Contrary thereto, the present enzymes are capable of effecting the deamidation by virtue of reaction with glutamine being bonded to the peptide.

Furthermore, though trans-glutaminase exhibits a slight reaction of deamidation of peptide-bonded glutamine, as mentioned previously, this enzyme has its inherent properties and activity to exchange a primary amine with amide group of glutamine within peptide or protein, and its ability to hydrolyze is far weak. In contradistinction thereto, the present both PGases have not any activity of the exchange of the primary amine, but shows hydrolysis activity, and is apparently different from trans-glutaminase in the above points.

Still further, trans-glutaminase does not react at all with γ-amide groups of such peptide-bonded glutamines as glycyl glutamine; glutaminyl glycine; glycyl glutaminyl glycine and the like. On the contrary, the present enzymes strongly react with these peptides having glutamine at C-terminal, N-terminal and at the internal position of the peptides.

Trans-glutaminase, moreover, indispensably requires $Ca^{++}$ to exhibit its activity, whereas the present enzymes do not have such property.

A process for producing beverages and foods, in which the present enzymes are employed, is illustrated hereinbelow.

The amount of enzyme to be added, time required for effecting reaction of the enzyme and other conditions may vary depending on the kind of proteinous final products. In preparing seasonings such as soy sauce comprising, as a principal ingredient, amino acids, particularly glutamic acid, where a protein containing raw material is treated in per se known method and the protein is decomposed, the present enzyme is added with stirring to the raw material system just before or during the fermentation and ripening operation so that the amount of the present enzyme either in the form of cell containing said enzyme, its extracted crude enzyme liquid or purified enzyme preparation may be 0.01 to 100 units per 1 ml. of the fermentation broth. Thereafter, procedures commonly employed in the production of bevarages and foods may be adopted therefore.

In the cases of solid foods such as miso, cheese and the like, the present enzymes having any of the above-mentioned forms may be added with thorough mixing in an amount of about 0.01 to about 100 units per 1 g. of the solid raw material just before or during the common ripening process step, and thereafter usual procedure may be taken therefor to obtain the final product.

By virtue of the addition of the present enzymes in the above manner, peptide type glutamic acid is formed, whereby the final product can be enhanced in palatability as compared with those obtained according to conventional processes without necessitating further promotion of hydrolysis to form amino acids as in the case of protease or the like.

The present enzymes react with glutaminyl-peptides which had been produced with protease from protein, forming glutamyl-peptides, and further this compound is hydrolyzed in the presence of peptidase to free glutamic acid. In producing beverages and foods using a protein-containing raw material having a high molecular weight, the presence of protease is indispensable to form such glutamyl-peptides or free glutamic acid by the action of the present enzyme. Usually, however, in the case of producing beverages and foods with the object of the present invention, the present enzyme can sufficiently and effectively exhibit its ability if such amount of proteinase or peptidase as may usually be used in the production of such beverages and foods, is present.

If necessary, in order to permit the present enzyme to act effectively, the addition of peptidase, protease and the like may be suitably choosed in accordance with the object of the beverages and foods to be produced.

Generally, the amount of the present enzyme, when added, may be 0.01 unit or more per milliliter or gram of a raw material.

The process of the present invention may be applied to any process for producing beverages and foods, wherein a protein-containing substance is used as a raw material and palatability of amino acids or peptides contained therein are utilized to improve the taste of said beverages and foods. For example, such beverages and foods, of which the palatable components are amino acids, particularly glutamic acid, include seasonings such as soy sauce, "mirin", vinegar and the like, beverages such as alcohols, and "miso" and cheese which contain, as palatable components, amino acids together with peptides.

In the accompanying drawings.

The present invention is illustrated below with reference to examples.

EXAMPLE 1

A culture medium was prepared, which contained 75 g. of lactose, 150 g. of peptone, 45 g. of yeast extracts, 3.4 g. of magnesium sulfate, 150 mg. of ferrous sulfate, 4.1 g. of potassium hydrogen phosphate, 25 g. of disodium hydrogen phosphate, 10 ml. of silicon oil and 15 L. of distilled water and was adjusted to pH 7.2. The medium was charged into a jar fermentor having a capacity of 30 l. and sterilized at 120°C. for 15 minutes. Separately, 750 ml. of a medium having the same composition as above was placed in a 3 l. conical flask, and No. 466 strain of *Bacillus circulans* was cultured therein with shaking at 30°C. for 12 hours. The sterilized culture medium was inoculated with the cultured strain.

After the inoculation, the culture was carried out at 30°C. with aeration at a rate of 8 L./min. and stirring at a rate of 350 r.p.m.

After about 8 hours, the growth of the strain reached a stationary phase, but the culturing was continued for additional 8 hours. At this point, accumulation of the peptidoglutaminase reached to the peak, that is, the contents of peptidoglutaminase-I and peptidoglutaminase-II were 0.312 unit and 0.334 unit per ml. of the fermentation liquor, respectively. The culturing was terminated and the cells of the strain were collected. The collected cells of the strain were found to be about 200 g. in wet weight. The wet cells may be usable as a mixed enzyme preparation of PGases-I and II such or in the form of the powder thereof prepared by use of acetone. 200 g. of the cells contained 2,340 units of PGase-I and 2,510 units of PGase-II as the total enzyme content.

EXAMPLE 2

110 Grams of the wet cells (1,287 units of PGase I and 1,375 units of PGase-II being contained as the enzyme content) was suspended in a 0.05 M phosphate buffer solution adjusted to pH 7.2. The cells were ground by means of a sonic wave disintegrator and the suspension was super-centrifuged. The resulted supernatant liquid was collected to give 400 cc. of a crude enzyme solution. This crude enzyme solution contained, as enzymes, 935 units of PGase-I and 1,203 units of PGase-II, of which the rates of recovery were 75 % and 88 %, respectively.

To this solution was added gradually a solution containing 400 mg. of streptomycin, thereby to eliminate the formed precipitate of nucleic acid, and was further precipitated at a saturation of 38–54 % with ammonium sulfate. The precipitated protein fractions were collected, whereby was obtained an ammonium sulfate-resolved enzyme comprising PGase-I of 950 mg. as protein and of 954 units as enzyme (a rate of recovery based on the crude enzyme solution: 102 %) and PGase-II of 954 mg. as protein and of 858 units as enzyme (a rate of recovery based on the crude enzyme solution: 98 %).

This resoluted enzyme may be usable as such or in the form of a powder after dialysis with an appropriate buffer solution and lyophilization.

EXAMPLE 3

The ammonium sulfate-resolved enzyme obtained in Example 2 was first dissolved in an aqueous mixed solution of 1/100 M phosphate buffer solution (pH 7.6), 1/10 M potassium chloride and 2/1000 M EDTA. The aqueous mixed solution was then passed through a column (4 cm × 90 cm) packed with Sephadex G-200, which had been buferred in advance with a buffer solution having the same composition as in said aqueous mixed solution, and then eluted with the same buffer solution. From the effluent, 10 ml. each of fractions having fraction number 50–70 were collected, whereby PGase-I and PGase-II were obtained, respectively. In this case, effective fractions of both enzymes were almost identical with each other. PGase-I enzyme was found to be 200 mg. as protein and 540 units as the total enzyme content (a rate of recovery based on the crude enzyme solution: 57 %), while PGuse-II was 200 mg. as protein and 784 units as the total enzyme content (a rate of recovery based on the crude enzyme solution: 65 %).

A partially refined mixed enzyme solution comprising PGase-I and PGase-II obtained according to the above-mentioned operation was adsorbed on a DEAE Sephadex column (2.0 cm × 40.0 cm), which had been buffered with an aqueous mixed solution of 1/100 M phosphate buffer solution (pH 8.0), 1/10 M potassium chloride and 2/1000 M EDTA. The adsorbed enzyme solution was eluted according to potassium chloride concentration gradient elution method within a range of from 0.1 M up to 0.5 M, whereby PGase-I was eluted at a potassium chloride concentration of from 0.17 M to 0.21 M, and PGase-II at from 0.23 M to 0.27 M.

Figure 1:
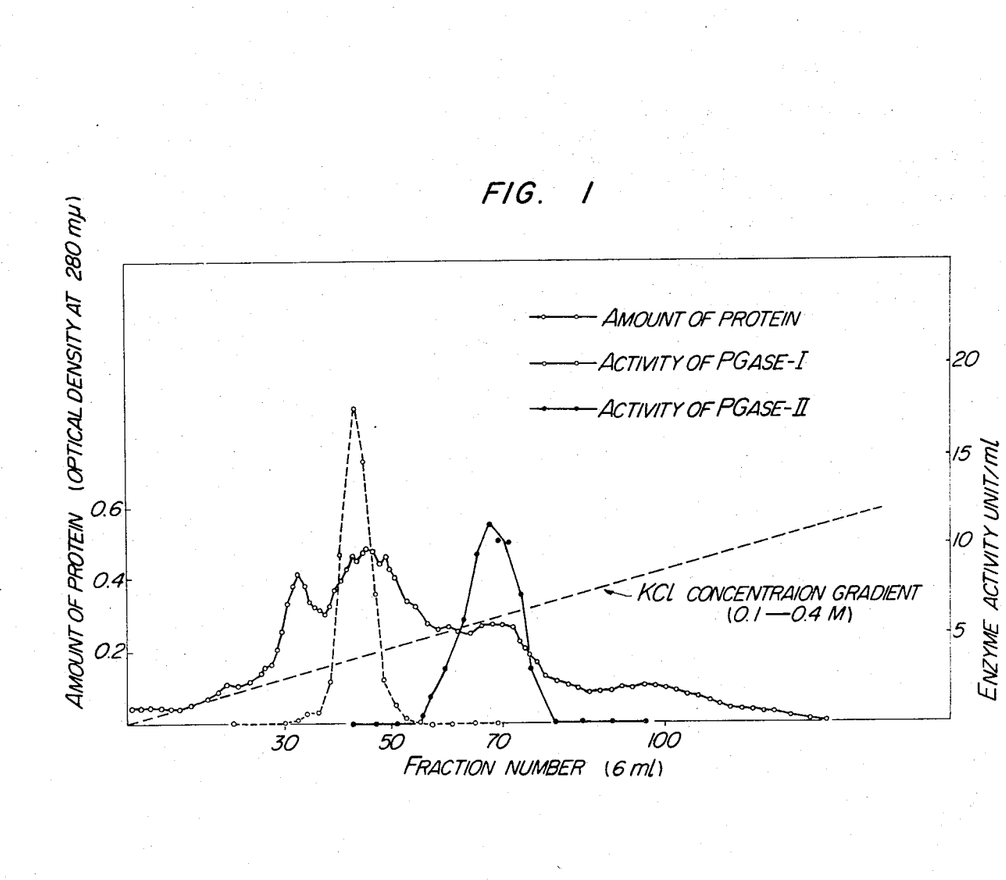
FIG. 1 is a diagram showing the results of PGase-I and PGase-II eluted with DEAE Sephadex column according to potassium chloride concentration gradient.

These purified fractions were collected to show that GPase-I was found to be 19 mg. as protein and 309 units as the total enzyme content (a rate of recovery based on the crude enzyme solution: 33 %), and PGase-II was 19.6 mg. as protein and 638 units as the total enzyme content (said recovery rate: 53 %). The results of the elution in the DEAE Sephadex column according to the potassium chloride concentration gradient method were as shown in FIG. 1.

Subsequently, the partially refined enzyme solutions of PGase-I and PGase-II were subjected respectively to chromatography by means of a column packed with hydroxylapatite (Bio Gel HT).

Firstly, the partially refined enzyme solution of PGase-I was adjusted to pH 7.0 with 1/100 M phosphate buffer solution and then passed through a column packed with hydroxylapatite, which had been buffered in advance with 1/100 M phosphate buffer solution (pH 7.0), and adsorbed thereon. The adsorbed enzyme was eluted out according to linear concentration gradient method using the same buffer solution at 0.02 M to 0.04 M in terms of phosphate concentration. The PGase-I enzyme thus eluted was found to be 2 mg. as protein and 129 units as the total enzyme content (a rate of recovery based on the crude enzyme solution: 13 %).

Secondly, PGase-II was eluted out, according to the same procedure as above at 0.035 M–0.05 M in terms of phosphate concentration.

The PGase-II thus eluted was found to be 3.5 mg as protein and 256 units as the total enzyme content (a rate of recovery based on the crude enzyme solution: 21 %).

The enzymes thus obtained were subjected respectively to dialysis with distilled water and dried in vacuo to obtain standard products of refined enzymes of PGase-I and PGase-II, respectively, in the form of a white powder.

Figure 2:
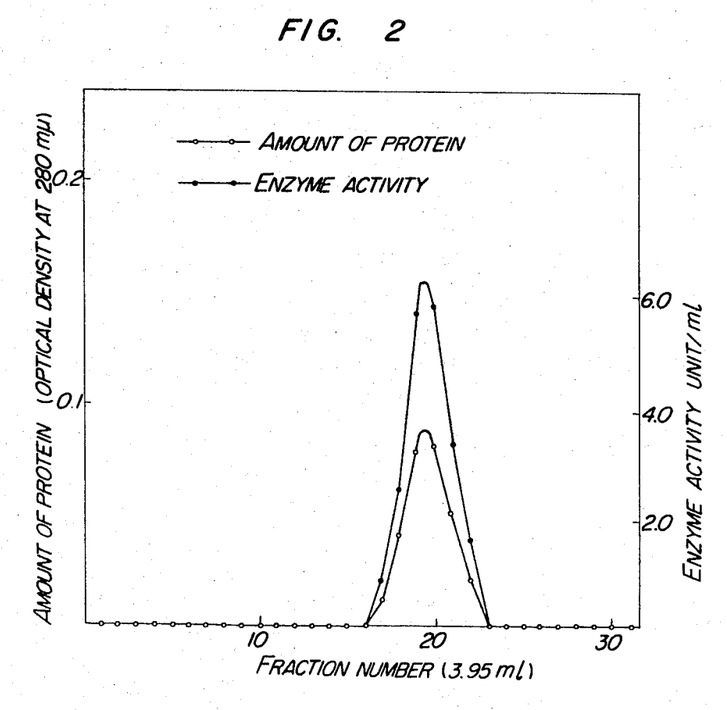
FIG. 2 is a diagram showing an elution curve of a purified enzyme preparation of PGase-I by means of Sephadex G-100.
Figure 3:
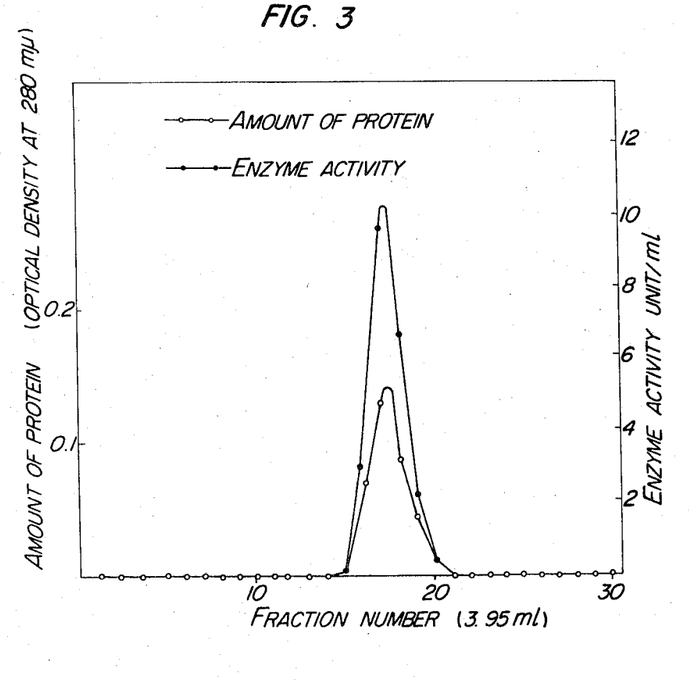
FIG. 3 is a diagram showing an elution curve of a purified enzyme preparation of PGase-II.

These refined enzyme standard products were subjected to chromatography with Sephadex G-100 to show that as shown in FIGS. 2 and 3, PGase-I and PGase-II showed their respective single peaks and they were homogeneous, respectively.

EXAMPLE 4

5 Kilograms of defatted soy bean, which had been subjected to water spray at a rate of 125 %, was cooked under steam pressure of 1 kg/cm² for 40 minutes. The cooked soy bean was mixed with 5 kilograms of roasted and powdered wheat, and soy sauce seed koji was sprayed thereupon. The culture was carried out in per se known manner for 4 days to obtain 12 kilograms of koji of excellent quality. The obtained koji was charged in 12 liters of a 24 % saline water and the saline koji broth was subjected to fermentation and ripening in per se known manner at about 30°C. for 3 months with aeration from time to time.

Separately, strain No. 466 of *Bacillus circulans* was cultured in a liquid medium (pH 7.2) prepared by adding 0.3 % of yeast extracts, 1 % of peptone, 0.5 % of lactose, 0.025 % of magnesium sulfate, 0.001 % of ferrous sulfate and 0.17 % of dipotassium hydrogen phosphate to 400 liters of water, at 30°C. for 16 hours with aeration-agitation. The bacterial cells, in which peptidoglutaminase-I and peptidoglutaminase-II had been accumulated, were ground by means of a sonic wave disintegrator and centrifuged to collect a supernatant solution, i.e. a crude enzyme solution. To the crude enzyme solution was added gradually a solution containing streptomycin and a sediment of nucleic acid was removed. The solution was further saturated with ammonium sulfate to a degree of 38–54 % and a sediment fraction was collected. The sediment thus obtained was lyophilized to obtain 4 grams of powdery crude enzyme (a mixture of PGase-I and PGase-II). This crude enzyme contained 4,300 units of PGase-I and 3,650 units of PGase-II. The thus obtained powdery peptidoglutaminase was added in an amount in terms of 2,000 units of PGase-I and 1,800 units of PGase-II to the above-prepared saline koji broth just before being subjecting to fermentation and ripening, and mixed therewith.

After the 3-month ripening at 30°C., the ripened mash was pressed to obtain 23 liters of a soy sauce containing the total nitrogen content of 1.7 %, of which the amount of glutamic acid was 18.9 mg/ml. This glutamic acid content represents 10.56 % of the product soy sauce taken as the proportion of the resultant glutamic acid nitrogen to the total nitrogen content. In view of the fact that a soy sauce, which had been prepared in the same manner as above but without addition of the peptidoglutaminase, contained glutamic acid nitrogen at 7.69 % to the total nitrogen content. It is understood from this example that glutamic acid nitrogen was markedly formed.

EXAMPLE 5

Example 4 was repeated to obtain the same saline koji broth. Separately, a mixed ammonium sulfate-precipitated crude enzyme of PGase-I and PGase-II was prepared according to the same procedure as in Example 4. Said crude enzyme mixture was subjected to Sephadex G-200 column with a mixed buffer solution comprising 1/100 M phosphate buffer solution (pH 7.6), 1/10 M potassium chloride and 2/1000 M EDTA. Of the effluent, fractions having fraction number of 50–70 were collected, and an enzyme mixture of PGase-I and PGase-II was obtained therefrom. The enzyme mixture was adsorbed on DEAE Sephadex column with a mixed buffer solution comprising 1/100 M phosphate buffer solution (pH 8.0), 1/10 M potassium chloride and 2/1000 M EDTA. Thereafter the adsorbed enzyme mixture was eluted using the same buffer solution as above according to potassium chloride concentration gradient elution method, said potassium chloride concentration being 0.1 M–0.5 M. There were obtained PGase-I at a potassium chloride concentration of 0.17 M–0.21 M, and PGase-II at 0.22–0.27 M. Both PGase-I and PGase-II were lyophilized to obtain the respective refined enzymes.

1,900 Units of the refined enzyme, PGase-I and 1,700 units of the refined enzyme, PGase-II were added to and mixed respectively with the saline koji broth, which had been previously prepared, just before being subjected to fermentation and ripening. Thereafter, the same procedure as in Example 4 was repeated to obtain a superior soy sauce excellent in palatability. In soy sauces thus prepared, into which PGase-I and PGase-II had been added, the values of the resultant glutamic acid nitrogen/the total nitrogen content were 8.18 % and 9.14 %, respectively. These values were excellent as compared with those of soy sauces into which neither PGase-I nor PGase-II had been added, 7.69 %.

EXAMPLE 6

100 Grams of wheat gluten was charged with tap water to total up to 380 ml., stirred and cooked under a pressure of 1 kg/cm$^2$ for 30 minutes. Thereafter, the cooked gluten was charged with 5 g. of a proteolytic enzyme (an enzyme commercially available, which is produced from *Aspergillus oryzae* and is partially refined: produced by Sigma Co. U.S.A.) and 2.4 g. of a peptidoglutaminase preparation (the ammonium sulfateprecipitated powder obtained in Example 4). The mixture was subjected to hydrolysis at 30°C. for 3 days in the presence of toluene, where the pH was 5.0.

After the hydrolysis was over, the reaction mixture was pressed to give 360 ml. of a gluten hydrolyzate which was markedly excellent in palatability. The liquid seasoning thus obtained contained 30 mg/ml of glutamic acid, whereas the same seasoning but without addition of the PGase preparation, contained only 8 mg/ml of the same.

This gluten hydrolyzate may be usable for the preparation of various seasonings and soups, either as such or after being concentrated or, if necessary, dried and powdered in per se known manner.

EXAMPLE 7

1.3 Kilograms of soy bean, which had been immersed in water in per se known manner at ordinary temperature for 12 hours, was cooked under a steam pressure of 0.3 kg/cm$^2$ for 1 hour and 40 minutes. Separately, 1.5 kg. of rice was immersed in water at ordinary temperature for 12 hours and steamed under atmospheric pressure for 1 hour 30 minutes. The steamed rice was sprayed with seed koji for miso (bean paste), and a solid culturing was effected at about 30°C. for 60 days. The cultured product was mixed with 400 g. of common salt. To said culture product was added 32 g. of wet cells prepared in per se known manner from cultured cells obtained by liquid culture of strain No. 466 of *Bacillus circulans* in the same manner as in Example 4, and thoroughly mixed therewith. The mixture was ripened by allowing to stand at 30°C. for 3 months. Thus, there was obtained a superior miso product. This product contained 46 % of water, 12 % of crude protein, 9.5 % of common salt and 6.5 mg/g of glutamic acid. While a control miso contained 5.1 mg/g of glutamic acid.

The present product was subjected to an organoleptic test to give extremely excellent results.

EXAMPLE 8

10 Liters of cow's milk was charged into a cheese vat and 1 % of a starter was added at 30°C., according to ordinary procedure for making gouda cheese, thereto. When the concentration of the lactic acid content reached 0.18–0.27 %, rennet was added so that the milk casein might coagulate in 10–15 minutes, and 1 g. of a peptidoglutaminase preparation (ammonium-precipitated powder) was further added thereto. The mixture was thoroughly stirred, thereby coagulating the protein thereof. Thereafter, whey was excluded therefrom. Coagulated curds were collected, and warmed and compressed in per se known manner and then charged with table salt. The resultant product was ripened at 15°C. for 2 months to obtain 830 g. of a final product.

The final product contained 38.0 % of water, 25.5 % of fat, 28.0 % of protein and 3.5 mg/g of glutamic acid. This product was subjected to organoleptic test to give the results that said product was found more favorable as compared with a final product prepared according to ordinary procedure.

What is claimed is:

1. A process for preparing a beverage or food containing, as a part of palatable components, peptides and/or amino acids obtained by hydrolysis of a protein-containing raw material, characterized by adding a member selected from the group consisting of bacterial cells, frozen cells, acetone treated powder of the cells, peptidoglutaminase-I, peptidoglutaminase-II and a mixture of peptidoglutaminase-I and peptidoglutaminase-II, which are originated from *Bacillus*, circulans ATCC 21590 to said beverage or food to increase the amount of L-glutamic acid and/or a peptide-bonded glutamic acid contained therein.

2. A process according to claim 1, wherein the protein-containing raw material is a member selected from the group consisting of soy bean, defatted soy bean, wheat flour, koji and milk.

3. A process according to claim 1, wherein the amount of the peptidoglutaminase to be added is 0.01 to 100 units per ml. of a desired beverage or food.

* * * * *